United States Patent
Thanos et al.

(10) Patent No.: US 9,647,834 B2
(45) Date of Patent: May 9, 2017

(54) SYSTEMS AND METHODS WITH CRYPTOGRAPHY AND TAMPER RESISTANCE SOFTWARE SECURITY

(71) Applicant: Aclara Meters LLC, Hazelwood, MO (US)

(72) Inventors: Daniel Thanos, Ontario (CA); Satish Sharad Khanke, Hyderabad (IN)

(73) Assignee: Aclara Meters LLC, Hazelwood, MO (US)

( * ) Notice: Subject to any disclaimer, the term of this patent is extended or adjusted under 35 U.S.C. 154(b) by 0 days.

(21) Appl. No.: 15/076,818

(22) Filed: Mar. 22, 2016

(65) Prior Publication Data
US 2016/0204935 A1 Jul. 14, 2016

Related U.S. Application Data

(62) Division of application No. 14/152,167, filed on Jan. 10, 2014, now abandoned.

(51) Int. Cl.
*G06F 21/86* (2013.01)
*H04L 9/08* (2006.01)
(Continued)

(52) U.S. Cl.
CPC ........... *H04L 9/0863* (2013.01); *G01D 4/002* (2013.01); *G06F 21/14* (2013.01); *G06F 21/52* (2013.01); *G06F 21/62* (2013.01); *G06F 21/75* (2013.01); *G09C 1/00* (2013.01); *H04L 9/0822* (2013.01); *H04L 9/0861* (2013.01); *H04L 9/14* (2013.01); *H04L 9/3226* (2013.01); *H04L 63/06* (2013.01); *H04L 63/062* (2013.01);
(Continued)

(58) Field of Classification Search
CPC ...................................................... G06F 21/86
See application file for complete search history.

(56) References Cited

U.S. PATENT DOCUMENTS 6,684,330 B1 1/2004 Wack et al.
2001/0027442 A1 10/2001 Krahn et al.
(Continued)

FOREIGN PATENT DOCUMENTS

WO 2008121157 A2 10/2008
WO 2010127438 A1 11/2010

OTHER PUBLICATIONS

PCT Search Report and Written Opinion issued in connection with corresponding PCT/US2015/010747 mailed Apr. 20, 2015.

*Primary Examiner* — Josnel Jeudy
(74) *Attorney, Agent, or Firm* — Polster, Lieder, Woodruff & Lucchesi, L.C.

(57) ABSTRACT

Provided is an arbitrary automation system for secure communications. The system includes a utility device configured for processing critical data associated with the arbitrary automation system, the critical data being structured in accordance with utility device access levels. A key management module (i) provides a data protection key (DPK) for protecting the critical data in accordance with each of the utility device access levels and (ii) generates a user key encryption key (UKEK) for encrypting the DPK based upon the device access levels. The system additionally includes a software module configured for masking an execution state of software within the utility device and the key management module via principles of evasion and resistance.

18 Claims, 5 Drawing Sheets

(51) Int. Cl.

| | |
|---|---|
| G06F 21/62 | (2013.01) |
| H04L 9/14 | (2006.01) |
| H04L 29/06 | (2006.01) |
| G01D 4/00 | (2006.01) |
| G06F 21/52 | (2013.01) |
| G06F 21/75 | (2013.01) |
| G06F 21/14 | (2013.01) |
| G09C 1/00 | (2006.01) |
| H04L 9/32 | (2006.01) |
| G06F 21/10 | (2013.01) |
| H04L 29/08 | (2006.01) |

(52) U.S. Cl.
CPC ............ H04L 63/105 (2013.01); *G06F 21/10* (2013.01); *G06F 2221/033* (2013.01); *G06F 2221/2125* (2013.01); *G06F 2221/2133* (2013.01); *H04L 67/12* (2013.01)

(56) References Cited

U.S. PATENT DOCUMENTS

| | | | |
|---|---|---|---|
| 2007/0226780 A1 | 9/2007 | Ronneke | |
| 2009/0100268 A1 | 4/2009 | Garcia et al. | |
| 2009/0110191 A1* | 4/2009 | Sanvido | H04L 9/0863 380/44 |
| 2009/0154707 A1* | 6/2009 | Lee | H04L 9/0822 380/278 |
| 2009/0201129 A1* | 8/2009 | Lane | G06Q 10/087 340/10.1 |
| 2011/0307699 A1* | 12/2011 | Fielder | H04L 63/123 713/172 |
| 2012/0089494 A1* | 4/2012 | Danezis | G06Q 20/102 705/34 |
| 2012/0180032 A1 | 7/2012 | Graunke | |
| 2012/0254622 A1 | 10/2012 | Kanungo | |
| 2014/0068257 A1 | 3/2014 | Burckard | |
| 2015/0310191 A1* | 10/2015 | Koval | H04L 67/12 713/189 |

\* cited by examiner

SYSTEMS AND METHODS WITH CRYPTOGRAPHY AND TAMPER RESISTANCE SOFTWARE SECURITY

CROSS REFERENCE TO RELATED APPLICATIONS

This is a United States divisional application and which is based upon and claims the benefit of currently pending non-provisional U.S. patent application Ser. No. 14/152,167 filed Jan. 10, 2014.

STATEMENT REGARDING FEDERALLY SPONSORED RESEARCH OR DEVELOPMENT

N/A

FIELD OF THE INVENTION

The present invention relates generally to software security. More particularly, the present invention relates to cryptographic security techniques for protecting critical industrial control system data and software integrity.

BACKGROUND OF THE INVENTION

There are many components to an industrial control system network, including smart devices (e.g., smart meters) that collect and store critical confidential data, such as login credentials, encryption keys, consumer privacy data, and business proprietary information.

A smart meter is a utility meter that records consumption in intervals and communicates the information via a communication network to a utility company. By way of example, smart meters can include smart electricity meters, gas meters, and water meters. This information can be used, among other things, for monitoring and billing purposes. In some cases, smart meters are used in an advanced metering infrastructure (AMI) system. AMI systems provide a two-way Internet protocol (IP) communications path between a smart meter and a service provider (e.g., an electric, gas, or water utility company).

More specifically, AMI systems include full measurement and collection subsystems including meters at the customer site, along with communication networks between the customer and the utility company. These AMI systems can also include data reception and management subsystems that make the information available to the utility company. The goal of an AMI system is to provide utility companies real-time data regarding power consumption. This process enables customers to make informed choices about energy usage based on the price at the time of use.

By way of background, FIG. 1 depicts an exemplary configuration of an AMI system 100. In FIG. 1, a customer site 101 (e.g., home or a business) collects time-based data via an electronic meter. Such meters can monitor one or more of three types of utilities: electricity 102, gas 104 and water 106. These meters have the ability to transmit the collected data through commonly available communication networks 108, such as public networks and broadband. The meter data are received by an AMI host system 110 and transmitted to a meter data management system (MDMS) 112. The MDMS 112 manages data storage and analysis to provide the information in a useful form to the utility company.

The collected data can include the accumulated energy and demand consumptions of a customer and are critical data to the utility company, being used for customer billing purposes. Any unauthorized access and/or tampering with this critical data can seriously affect, for example, the company's revenue and profits. Furthermore, the smart meter manufacturer's software stores the security codes that provide complete access to the meters and the meter data. The root of the security of the smart meter system resides in the software application, which can configure the critical data (e.g., access credentials/access codes) as it is stored. The unauthorized disclosure of such data can compromise system wide security. Hence, the protection and security of smart meter data is paramount.

Many conventional systems provide software security using techniques such as encrypting the user credentials directly with randomly generated keys, storing the salted hash of the users' passwords, and using homegrown encryption algorithms for password protection. Other techniques include protecting the application database file using a user provided password and encrypting the software database file upon exit of an application, and decrypting when the software is running. However, all these conventional techniques are inadequate for protecting against current security vulnerabilities.

A successful breach of one or more smart meters could catastrophically impact operations of a utility company. A security breach would permit the theft and misuse of access credentials, customer privacy data, and company proprietary information which can lead to power theft or broader penetrations of AMI networks.

SUMMARY OF EMBODIMENTS OF THE INVENTION

Given the aforementioned deficiencies, a need exists for security software systems and methods that adequately protect the security critical data used by smart meters in the AMI system. There is also a need for security software which operates as companion software to the energy meter manufacturer software to provide adequate security.

In certain circumstances, embodiments of the present invention provide an arbitrary automation system to enable secure communications in an industrial control system network (ICN). The system includes a utility device configured for processing critical data associated with the arbitrary automation system, the critical data being structured in accordance with utility device access levels. Also included is a key management module for (i) providing a data protection key (DPK) for protecting the critical data in accordance with each of the utility device access levels and (ii) generating a user key encryption key (UKEK) for encrypting the DPK based upon the device access levels. The system additionally includes a software module configured for masking an execution state of software within the utility device and the key management module via principles of evasion and resistance.

Illustrious embodiments of the present invention provide security techniques that uses, databases, or other data or file management mechanisms to store application user information. The techniques authenticate and authorize access by a user, with multiple protection and access levels, based on data stored in a database. This approach provides protection of user credential and security critical data from various attacks, such as unauthorized replacement of data files from one computing platform to another.

The embodiments also prevent unauthorized users from modifying user credentials and security critical data to gain unauthorized application and system privileges. User authentication and authorization granted without requiring storage of actual user passwords or credentials. This approach makes theft, and offline decoding of credentials, infeasible using known cryptanalysis and password cracking techniques based, for example, on rainbow tables.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

Figure 1:
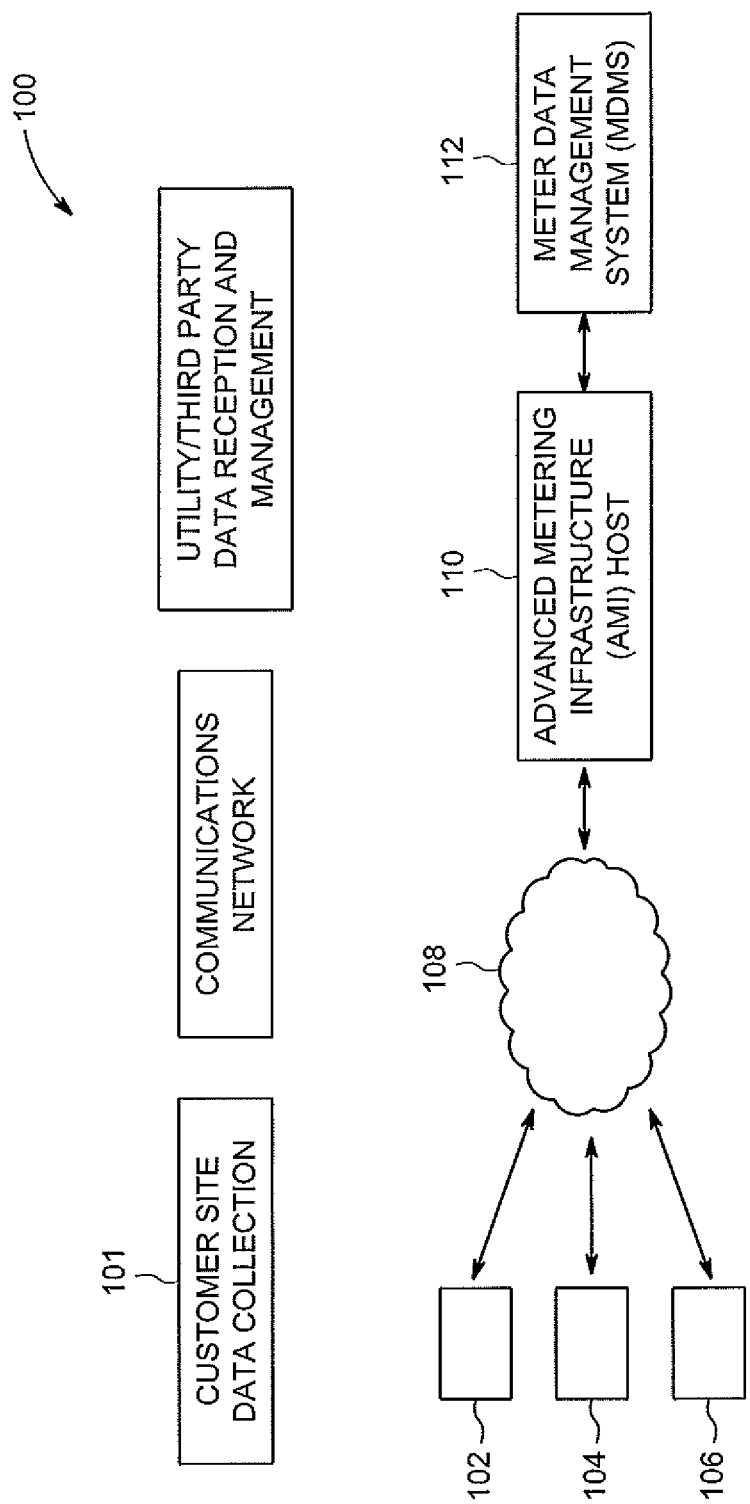
FIG. 1 is a basic configuration of an AMI system in which embodiments of the present invention may be practiced.

The present invention may take form in various components and arrangements of components, and in various process operations and arrangements of process operations. The present invention is illustrated in the accompanying drawings, throughout which, like reference numerals may indicate corresponding or similar parts in the various figures. The drawings are only for purposes of illustrating preferred embodiments and are not to be construed as limiting the invention. Given the following enabling description of the drawings, the novel aspects of the present invention should become evident to a person of ordinary skill in the art.

DETAILED DESCRIPTION OF VARIOUS EMBODIMENTS

The following detailed description is merely exemplary in nature and is not intended to limit the applications and uses disclosed herein. Further, there is no intention to be bound by any theory presented in the preceding background or summary or the following detailed description.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teachings and in no way limit the scope of the teachings, it will be clear to one of skill in the art that the use of the singular includes the plural unless specifically stated otherwise. Therefore, the terms "a," "an" and "at least one" are used interchangeably in this application.

Various embodiments of the present invention combine three independent protection schemes (e.g. software tamper resistance/security, data encryption/dynamic key management, and one time password authentication) to form a system that can provide total software security and protection of secrecy.

Exemplary embodiments provide protection for security critical data in a simple and autonomous manner for secure device management using purely software means on an untrusted host. Also provided are very high levels of data security for fixed or portable commercial applications. The security system provides increased security for existing applications and networks, and enables developers to add security features to new and existing products.

An exemplary smart meter software application environment enables user to create and maintain programs for electronic meters based upon building blocks from standard sets of related parameters. That is, the user can configure each of the parameters in a building block to set the meter to operate in a desired manner. These building blocks are later identified and saved in a database. To create a program, the user simply selects from the existing building blocks that are shareable across numerous programs.

Figure 2:
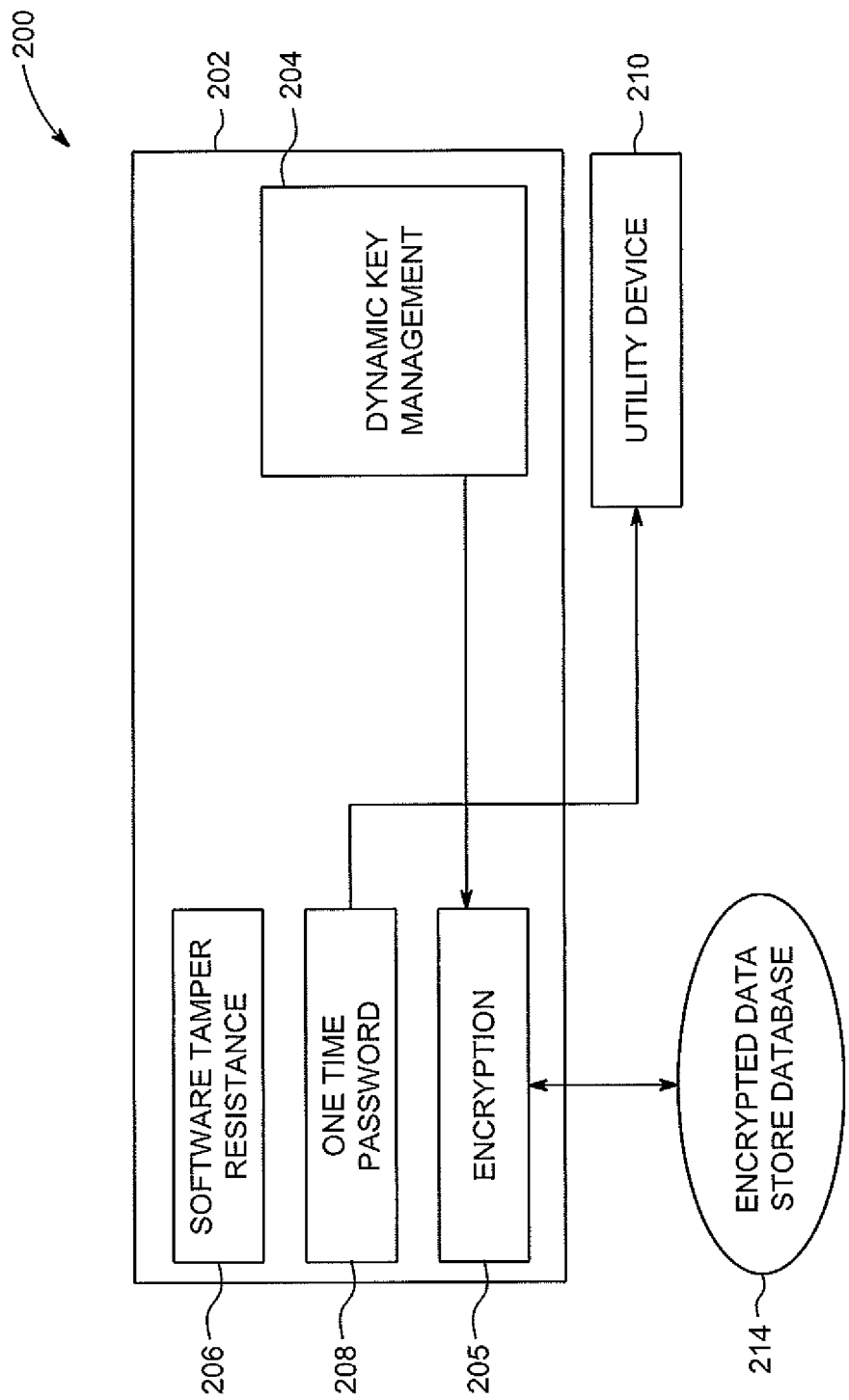
FIG. 2 is a block diagram of an exemplary software security system in accordance with embodiments of the present invention.

FIG. 2 is an illustration of an exemplary security system 200 (e.g., an arbitrary automation system), in accordance with the embodiments. The security application module 202, for example, can be implemented within a utility system control room network or a related master server. The application module 202 could also be implemented within a MeterMate™ environment (discussed above), or within other components of an AMI network system, such as the AMI host 110, noted above with respect to FIG. 1.

Alternatively, the security application module 202 can be configured as standalone software for execution on a personal computer or a laptop. The security application module 202 can be used by a software application that employs databases (both local and remote over the network) or other data or file management mechanisms to store application user's information.

The security application module 202 advantageously eliminates the need for storing passwords, keys, or other secret material in any way (e.g., that would require its own protections). That is, secret material required for forming the necessary materials fundamental to encryption and access do not need to be stored. Also, the security application module 202 is distributed, self-contained, and does not require any server component for execution.

In more specific terms, the arbitrary automation system 200 is an industrial control network (ICN) including a security application module 202, a utility device 210, and an encrypted data store database 214.

The utility device 210 can include devices, such as a smart meter, a gas meter, and a water meter, just to name a few. The encrypted data store 214 can include any standard computer storage media for storing critical data, such as security codes fundamental to operation of the utility device 210. For example, this stored critical data can include smart meter security, credentials, and access codes.

The security application module 202 includes combined architecture and security techniques to ensure security of the arbitrary automation system 200. By combining these techniques in the security application module 202, the entire security process is rendered portable and is easily distributed amongst a large number of devices.

For example, the security application module 202 includes a dynamic key management module 204, an encryption engine 205, a software tamper resistance module 206, and a one-time password (OTP) engine 208 for providing truly dynamic authentication of access to the arbitrary automation system 200.

This unique combination of security techniques provides the necessary software security and protection to ensure of privacy and secrecy of critical data. The exemplary combination of security techniques depicted in FIG. 2, more specifically the security application module 202, form the root of security and trust.

The dynamic key management module 204 manages the secure generation, distribution, and storage of the encryption keys. The encryption engine 205 generates the encryption algorithm and/or encryption key. The encryption algorithm acts upon the critical data to transform the data to cipher text, representative of the encrypted message or encrypted data. The encryption key controls the encryption/decryption algorithm to transform the data into cipher text. For a key-based algorithm, both the encryption and decryption operation use this key.

By way of background, the security of the algorithm that encrypts data rests in generating the key. If a system uses a cryptographically weak process to generate keys, then the whole system is weak. A hacker need not cryptanalyze the encryption algorithm; the hacker can cryptanalyze the key generation algorithm. Therefore, the security system must efficiently manage and securely protect its keys. The encryption engine 205 may be implemented via a variety of encryption schemes employing standard ciphers/algorithms such as HMAC-SHA-256, AES, PBKDFv2, etc.

In general, cryptographically protected data are dependent on the protection of the encryption keys. After generating the keys, maintaining key secrecy is critical. The theft, loss, or compromise of a key can compromise the entire system. Key management is crucial to maintaining good, cost-effective, and secure communications among a large number of devices.

The dynamic key management module 204 automatically and transparently generates role-based keys based on a user simply entering passwords. The key management module 204 allows for multiple unique users of shared roles to access the system 200 such that all security critical data can be protected according to access levels on the targeted device being managed and configured.

With the use of pass phrase key management, an entire phrase, instead of a word, is converted into a key. The dynamic key management module 204 may use different approaches to compute a hash function. For example, there are existing standard methods for secure hashing such as the SHA (described in in the federal information processing standards (FIPS) publication 180).

The SHA generates a message digest based on a hash function. The SHA is secure because it is designed to be computationally infeasible to recover a message corresponding to a given message digest. A message digest computed using a hash function does not reveal anything about the input used by the hash function. Therefore, the pass phrase and SHA methods provide security against current dictionary and cryptanalytic attacks.

The software of the dynamic key management module 204 provides the option to the user to export the security. The password used for generating the export file can be shared amongst the intended users. Initially, the intended user enters the password to import the security information file. The client or receiving software verifies that the entered password is correct. When the password is verified, the module 204 prompts the user to provide login credentials to access the application, and receive authorization to perform the intended operations.

Initialization can include sequences involving booting, rebooting, starting and restarting of an application. In various embodiments, at a high-level, a suitable key management scheme may include one or more features from various key management schemes well known to those of skill in the art.

All data records of the application can be authenticated using a message authentication code (MAC). By way of example, the MAC can be based upon the HMAC-SHA-256 algorithm, noted above. The key used for the MAC will be the appropriate DPK based on the particular role. Because the appropriate DPK will be encrypted by a UKEK, only an authorized user will be able to verify their record and any other data records in the application their DPK grants them access to by virtue of the cryptography. In this way, the cryptography itself provides authentication of the user without the need to store or compare any passwords (encrypted or otherwise).

In various embodiments, the dynamic key management module 204 can utilize, for example, symmetric encryption, which uses the same key for encrypting and decrypting data. An example of a symmetric encryption protocol is the data encryption standard ("DES") or the advanced encryption standard ("AES").

For example, the encryption engine 205 provides a one-time authentication password/device security code for accessing the utility device 210. This new password is desirably stored encrypted in the encrypted data store database 214, along with the previous password, in case of an error in setting the new password. The same can be achieved with respect to the utility device 210.

Additionally, the dynamic key management module 204 allows for multiple unique users of shared roles such that all security critical data can be protected according to access level on the targeted device that is being managed and configured. Also, the key management module 204 provides for application integrity controls and cryptographic data binding such that security critical data/credentials cannot be composed and used in an unauthorized fashion with another instance of software. At the same time, current instances of executing software cannot be tampered with to grant unauthorized access/elevated privileges.

The dynamic key management module 204 protects critical data using encryption algorithms (e.g., AES-256-CBC) and keyed message authentication codes for data integrity. By way of example only, and not limitation, the key management module 204 includes cryptographically strong random number generation and passphrase based key derivation.

Using techniques such as the exemplary techniques above, the dynamic key management module 204 provides security against current dictionary and cryptanalytic attacks. Data for each level of access/role (e.g., master, reader, and customer as found in the MeterMate software) is protected using a randomly generated DPK. The DPK is encrypted under a dynamically generated UKEK for each user, and user level accessing the DPK according to their role (e.g. master, reader, etc.).

The UKEK is generated and used upon user login and is always destroyed after use in memory, it is never stored. The integrity of each record in the application data stores is protected using the DPK. Further, an application protection key (APK) is generated (e.g., a cryptographically random 256 bit) and used for authenticating the complete database and security information file. This process prevents record/file substitution attacks for elevated privileges.

In various embodiments, software tamper resistance and security module 206 can be incorporated into the system 200 to detect attempts to tamper with the system's program operation and detect alteration of confidential information. One of the goals of the software tamper resistance module 206 is to make attempted attacks detectable. The software tamper resistance module 206 provides tamper resistance to make it difficult to access the critical data. The software resistance module 206 also provides tamper detection to detect attempts at accessing and manipulating the critical data.

Software tamper-proofing is well known, and there are many well-established methods that employ hardware roots of trust and other software based methods. In contrast to conventional techniques, the software tamper resistance module 206 provides a novel approach that does not exclusively rely on hard preventative controls (e.g., performing only cryptographic based integrity checks in memory and during startup). The software tamper resistance module 206 employs techniques of reverse engineering evasion and random execution such that it is impossible for even the designer of the program to know the current execution state and how to actually find the correct threads of execution to attach to so that a malicious user cannot even begin to tamper with a process or begin to reverse its cryptographic materials and secrets.

In many classes of applications, hardware based protection methods of software is not reliable and the cost is expensive. Hence, the design according to the present teaching is the most practically secure way to provide tamper-proofing. Its novelty is based on the concept of evasion (using entropy and anti-debugger methods) and resistance (through classical software integrity checks and redundant and random threads of execution which all monitor each other).

The software integrity protections of the software tamper resistance module 206 contain anti-debug controls that prevent tampering tools from interrupting or attaching to processes. Security critical sections of software contain anti-debug controls (specific machine code level routines dependent on hardware and OS platform) that prevent tools used for software reverse engineering and tampering from interrupting critical processes and attaching to them in order to access or change their data.

Another feature of the software integrity protection provided in the memory is data protections that prevent unauthorized processes from writing to security critical data structures as well as cryptographic MACs, which can detect tamper or unauthorized changes and take corrective action.

A further feature of the software integrity protection includes randomized and distributed execution of the software over threads using existing processes such that which process to attach to for tampering is unknown. Randomized execution distributes the execution of the software over a random number of threads using existing processes in the platform such that no outside party can detect which process they are running on for possible tampering and disabling.

Another feature of the software integrity protection is redundant execution that ensures security critical sections of the software run in n copies of threads. It monitors each copy for termination or tamper, and resumes execution and spawns more redundant threads.

Another technical advantage includes software that provides a unique mechanism to address security concerns of energy utility companies for protecting user credentials and sensitive data such that they are difficult to reverse engineer. This technical advantage results in a system that is extremely difficult to reverse engineer, and that implements a flexible policy for protecting confidential information that cannot be easily compromised.

During operation of the arbitrary automation system 200, fresh application installations will only install the application but do not generate the initial databases, credentials, and associated key materials until the application initialization process is performed, which will described below. Upgrade application installations will prompt the user for an initial login and password for master user and all the initial databases and associated key materials will be generated as per the application initialization.

In the exemplary embodiments of the present invention, the OTP system 208 can be implemented in several ways. In a first approach, upon each software access to the smart meter software, a new password (n byte value) is set for the next access which is based on a cryptographically strong random number generator. Then, the new password can be stored encrypted in the software database 214 along with the previous password, in case there was an error in setting the new password. The procedure is also performed on the meter device.

In a second approach, the software and the device (i.e., the meter) share a crypto random generated seed value (e.g. 256 bit value). Based on the current time, a one-time password is generated (every n units of time, e.g. every 5 minutes) based on applying SHA-256 (CurrentTime+SeedValue). CurrentTime can be any normalized time value between the meter and the software. The resolution of time can be a user setting, for example, generating a new password every minute, once a day or monthly.

Figure 3:
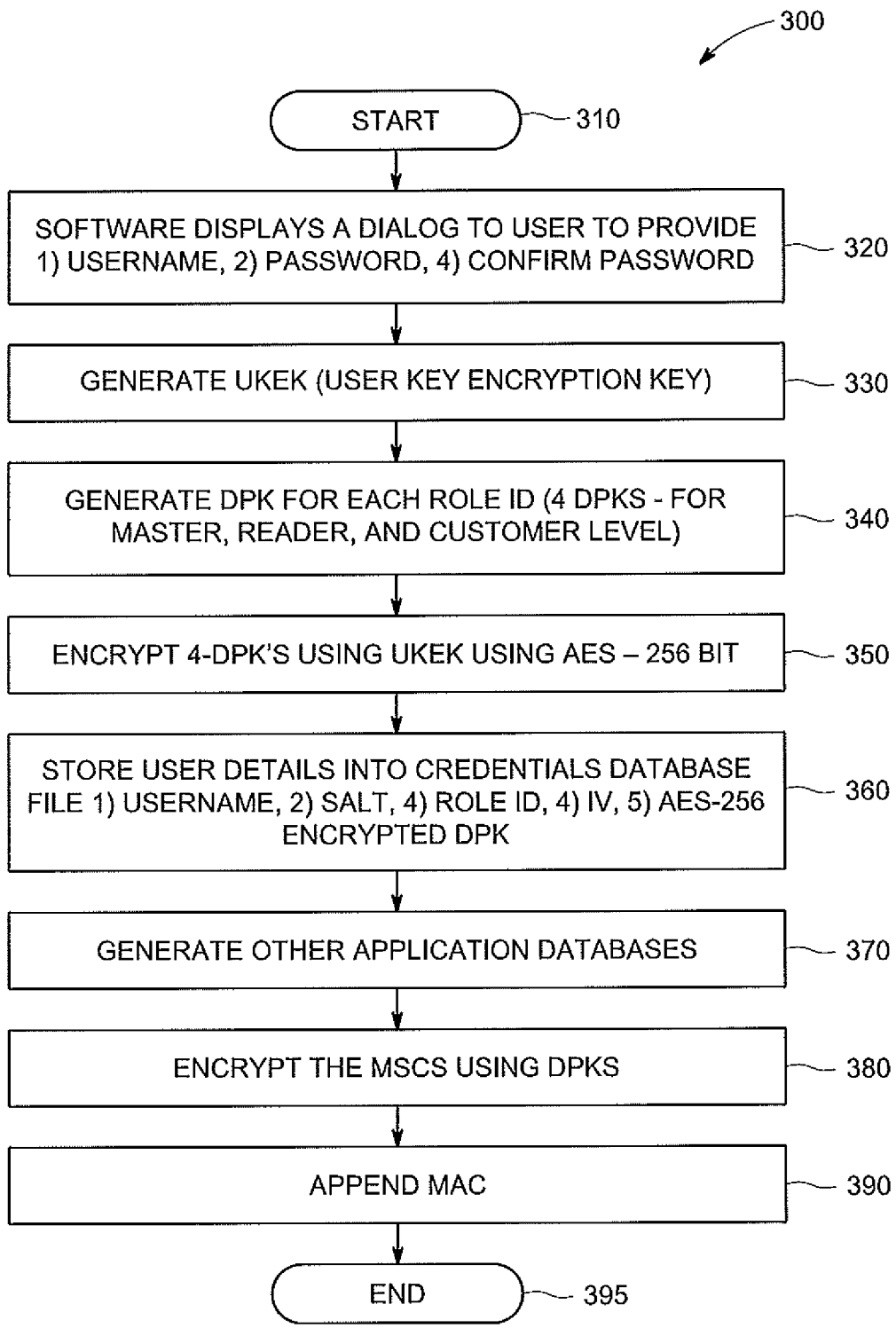
FIG. 3 is a flowchart of an exemplary application initialization method performed in accordance with the embodiments.
Figure 4:
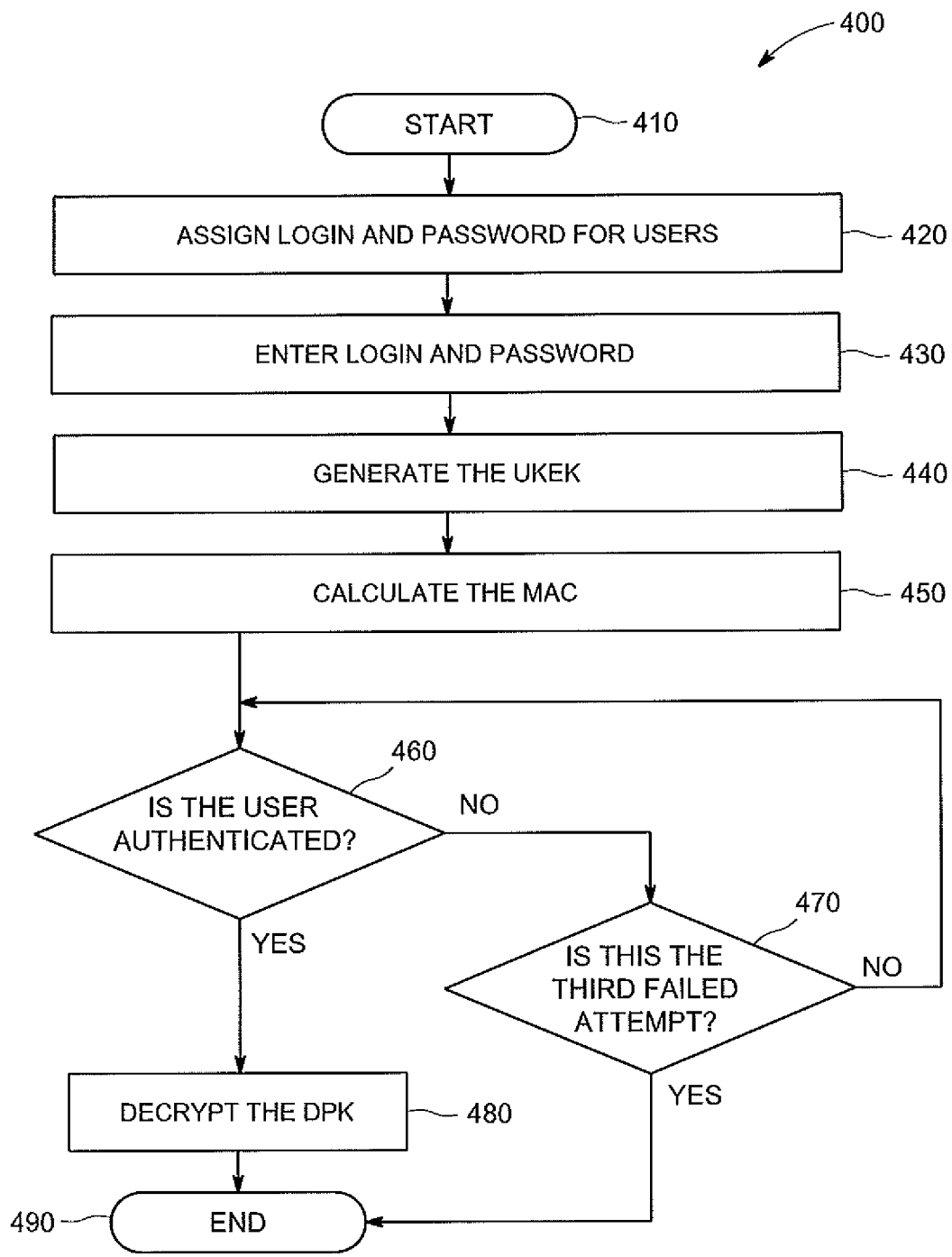
FIG. 4 is a flowchart of an exemplary login and authentication method performed in accordance with the embodiments.
Figure 5:
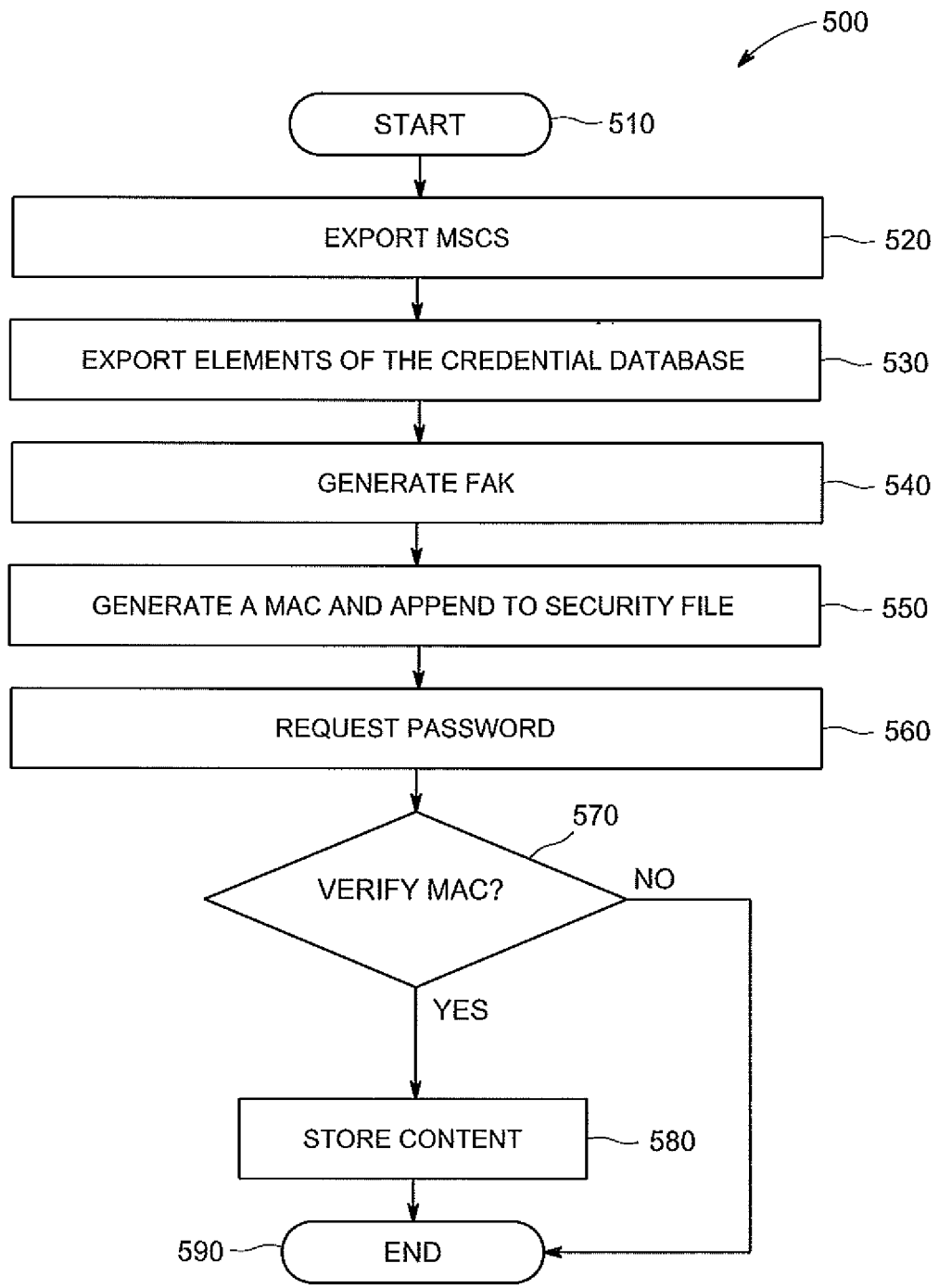
FIG. 5 is a flowchart of an exemplary encrypted security file generation and implementation method performed in accordance with the embodiments.

FIGS. 3-5 are examples of ways in which various embodiments of the present invention are implemented. More specifically, FIG. 3 is an exemplary flowchart of a process 300, in which the security application module 202 initializes the process. In step 310, the application initialization process starts. In step 320, the user will be prompted to provide a login and password for an initial master level user.

In step 330, the UKEK (as well as supporting Salt) will be generated based on this password. The password provided for the master role and all roles will be required to meet strong password complexity rules (e.g. as found in Windows™ policies for strong passwords). The user will be asked to provide the initial meter security codes (MSCs) for the master, reader, and customer.

In step 340, a DPK will be generated for each of the master, reader, and Customer roles. In step 350, the master DPK will encrypt copies of the Reader and Customer roles (as the master needs access to all MSCs as well as data for the creation/modification of users) and store them appropriately. The master DPK will be encrypted by the initial master Level user UKEK generated in step 330.

In step 360, the initial master level user credentials will be stored in the credentials database with the following record format:

Header (first unique record of the database): AES-256-CBC encrypted copies of the Reader and Customer DPK.

Username

Salt (32 byte value used as an IV for AES encryption as well as the necessary random value in the PBKDFv2 key generation).

RoleID (e.g. master, reader, and customer)

Encrypted DPK: AES-256-CBC encrypted DPK (for their access level) using the UKEK.

Verifier: MAC of the Username+Salt+RoleID+Encrypted DPK using the UKEK.

In step 370, the database which stores the initial MSCs will also have its individual MSCs encrypted (e.g., using AES-256-CBC) using the appropriate DPK for the access level of the data. In step 380, all database files will have a MAC appended to them and the APK will be used as the key. The process ends at step 385.

During a user creation and modification operation, only a master level user can create other accounts of any role or level. When creating a new user the master level user will provide the login, password (which will be set according to strong complexity rules), and role or access level of the new user. The UKEK will be generated for the new user including their salt. Then, the new user record will be added to the credential database according to the format specified in the application initialization process 300.

FIG. 4 is an exemplary flowchart of a process 400, in which the security application module 202 authenticates a user to login into the system. In step 410, the login and authentication process starts. In step 420, there will be unique logins and passwords for each user assigned to the three roles or access levels (master, reader, and customer). In step 430, a user shall enter their login and password, and, in step 440, their UKEK will be generated on that basis using PBKDFv2 as well as their stored Salt in their user record of the credential database.

In step 450, the UKEK for the user will be used to calculate the MAC of the user's record in the credential database. In step 460, if the MAC calculated matches the MAC stored in the record, the user will be authenticated as an authorized user. In step 460, if the MAC calculated does not match the user's record in the credential database, the authentication will fail.

After three successive failure attempts in step 470, the application will exit in step 490 and a failed login event will be recorded in the Operating System event log. Upon successful authentication in step 460, the user can decrypt their DPK with their UKEK in step 480. The DPK will then be used for the encryption/decryption as well as authentication of all data that their roles grants them access to. The process ends in step 490.

During a data access or management operation, whenever a user changes data in any record, a new MAC will be generated for that record when stored. The individual user records in the credential database will use their UKEK for the MAC.

Whenever a user accesses the MSCs, they will need the appropriate DPKs (e.g. master, reader, and customer) for those MSCs in order to decrypt them. Upon changing any MSCs, the MSCs will need to be re-encrypted with the same DPK. Whenever a database file is changed, the MAC for that entire file will be calculated and stored. The APK will be used as the key for this MAC.

FIG. 5 is an exemplary flowchart of a process 500, in which the security application module 202 generates and uses encrypted security files. In step 510, the encrypted security file generation and implementation process begins. All MSCs are already encrypted; thus, in step 520, they will be exported to the MMComm security file in the same format. In step 530, the appropriate elements of the credential database (only for the needed access levels/users) will also need to be exported together or within the security file as it contains all the necessary key material/role information.

In step 540, a file authentication key (FAK) will be generated when the Security File is created based on an export password the user provides. In step 550, a MAC will be generated and appended to the security file using the FAK. In step 560, when the software application imports the security file it will ask for the import password (same as the export password on the MeterMate application that generated the file) and verify the MAC in step 570. In step 570, if the verification fails, the file will not be imported and an operating system event log entry will be generated recording the tamper event and the process ends in step 590.

In step 570, upon successfully verifying the MAC and importing the Security file to the communication program. In step 580, the HMAC is removed from Security file and the file is marked as imported. The process ends in step 590.

Additional embodiments of the present invention require a user specified password for exporting and importing the security file. This requirement, for example, protects the content of the security file since the file will not be useful to an attacker without the password used for the exported file.

CONCLUSION

The detailed descriptions may have been presented in terms of a software application executed on a computer or network of computers. These procedural descriptions and representations are the means used by those skilled in the art to most effectively convey the substance of their work to others skilled in the art. The embodiments of the invention may be implemented as apparent to those skilled in the art in hardware or software, or any combination thereof. The actual software code or hardware used to implement the present invention is not limiting of the present invention.

Thus, the operation and behavior of the embodiments often will be described without specific reference to the actual software code or hardware components. The absence of such specific references is feasible because it is clearly understood that artisans of ordinary skill would be able to design software and hardware to implement the embodiments of the present invention based on the description herein with only a reasonable effort and without undue experimentation.

Each operation of the method may be executed on any general computer, such as a mainframe computer, personal computer or the like and pursuant to one or more, or a part of one or more, program modules or objects generated from any programming language, such as Visual Basic, C#, C++, Java, FORTRAN, etc. And still further, each operation, or a file, module, object or the like implementing each operation, may be executed by special purpose hardware or a circuit module designed for that purpose.

For example, the invention may be implemented as a firmware program loaded into non-volatile storage or a software program loaded from or into a data storage medium as machine-readable code, such code being instructions executable by an array of logic elements such as a microprocessor or other digital signal processing unit. Any data handled in such processing or created as a result of such processing can be stored in any memory as is conventional in the art.

By way of example, such data may be stored in a temporary memory, such as in the random access memory (RAM) of a given computer system or subsystem. In addition, or in the alternative, such data may be stored in longer-term storage devices, for example, magnetic disks, rewritable optical disks, and so on.

An embodiment of the invention may be implemented as an article of manufacture comprising a computer usable medium having computer readable program code means therein for executing the method operations of the invention, a program storage device readable by a machine, tangibly embodying a program of instructions executable by a machine to perform the method operations of the invention, or a computer program product.

Such an article of manufacture may include, but is not limited to, CD-ROM, CD-ft CD-RW, diskettes, tapes, hard drives, computer system memory (e.g. RAM or ROM), and/or the electronic, magnetic, optical, biological or other similar embodiment of the program (including, but not limited to, a carrier wave modulated, or otherwise manipulated, to convey instructions that can be read, demodulated/decoded and executed by a computer).

Indeed, the article of manufacture, program storage device or computer program product may include any solid or fluid transmission medium, whether magnetic, biological, optical, or the like, for storing or transmitting signals readable by a machine for controlling the operation of a general or special purpose computer in accordance with the embodiments.

Those skilled in the art will also appreciate that various adaptations and modifications of the preferred and alternative embodiments described above can be configured without departing from the scope and spirit of the invention. Therefore, it is to be understood that, within the scope of the appended claims, the invention may be practiced other than as specifically described herein.

We claim:

1. An apparatus providing secure communication between one or more users of an industrial control system (ICS) device to prevent tampering with or the theft of critical data stored by the device, the apparatus comprising:
   a security application module having a microprocessor, a memory and stored computer executable instructions that includes instructions for a key management module, an encryption engine, a tamper resistance module, and a password engine;
   the key management module configured to protect critical data,
   the key management module by employing encryption algorithms and keyed message authentication codes that preserve the integrity of the critical data, the encryption algorithms and keyed message authentication codes utilizing cryptographically strong random number generation and password based key derivations;
   the encryption engine configured to generate, provide and use one or more encryption algorithms and/or encryption Keys each of which is unique to each of the users, and each encryption key generated to use an encryption/decryption algorithm to transform critical data into cipher text, and each encryption key being generated, provided and used as a one-time use only key which is destroyed after its one-time usage;
   the tamper resistance module configured to detect unauthorized attempts to access the critical data, said tamper resistance module Utilizing reverse engineering evasion and resistance, and random execution, wherein a current execution state of the ICS device cannot be determined by any user or person accessing the ICS device thereby preventing tampering with, or the theft of, any critical data;
   wherein none of the key management module, the encryption engine, the tamper resistance module, and the password engine otherwise stores encryption keys and passwords that otherwise can be a potential threat for tampering with or the theft of critical data.

2. The apparatus of claim 1, wherein each of the users is associated with one of a plurality of unique access levels, the one or more encryption keys being respectively associated with a unique access level.

3. The apparatus of claim 2, wherein wherein the encryption engine generates the encryption key responsive to a phrase of two or more words received as a password entered by a user into a user interface of the ISC device.

4. The apparatus of claim 1, wherein the reverse engineering evasion of the tamper resistance module includes entropy and antidebugging.

5. The apparatus of claim 1, wherein the password authentication engine produces a one-time password based upon at least one of (i) a random number generator, and (ii) a value representing the current time combined together with a generated random value.

6. A method for providing secure communications between one or more users of an industrial control system (ICS) device associated with critical data, the method comprising:
   in a security application module having a microprocessor, a memory and stored computer executable instructions that includes instructions for a key management module, an encryption engine, a tamper resistance module, and a password engine;
   employing encryption algorithms and keyed message authentication codes to protect the critical data by preserving the integrity of the critical data, the encryption algorithms and keyed message authentication codes utilizing cryptographically strong random number generation and password based key derivations;
   generating, providing, and using, via the encryption module, one or more encryption algorithms and/or encryption keys each of which is unique to each of the respective users, each encryption key generated to use an encryption/decryption algorithm to transform critical data into cipher text, and each encryption key being generated, provided and used as a one-time use only key which is destroyed after its one-time usage;
   detecting, via the tamper detection module, unauthorized attempts to access the critical data, said tamper resistance module utilizing a reverse engineering evasion process, a resistance process, and a random execution process, wherein a current execution state of the ICS device cannot be determined by any user or person accessing the ICS device thereby tampering with, or the theft of, any critical data;
   and producing, via the password authentication engine, a one-time password each time the ICS device is accessed;
   wherein each of the steps of the employing encryption algorithms and keyed message authentication codes, the generating the encryption algorithms and/or encryption keys, the detecting of unauthorized attempts to access the critical data, and the producing of one-time passwords are each performed substantially independently of each of the other steps, and wherein the security application module does not otherwise store encryption keys and passwords that can be a potential threat for tampering with or theft of critical data.

7. The method of claim 6, wherein each of the users is associated with one of a plurality of unique access levels, the one or more encryption keys being respectively associated with a unique access level.

8. The method of claim 7, wherein an encryption key comprising a phrase of two or more words is generated when a respective user enters a password.

9. The method of claim 6, wherein in the detecting unauthorized attempts to access the critical data step, the utilizing of reverse engineering evasion and resistance, and random execution in protecting against unauthorized attempts to access critical data includes the methods of entropy and antidebugging.

10. The method of claim 6, wherein producing one-time password includes producing the password based upon at least one of (i) a random number generator, and (ii) a value representing the current time combined together with a generated random value.

11. A nontransitory computer readable media storing instructions which, when executed, cause the performance of processes within a security application module having a microprocessor to provide secure communication between one or more prospective users and an industrial control system (ICS) device associated with critical data in accordance with a method comprising:

employing encryption algorithms and keyed message authentication codes to protect the critical data by preserving the integrity of the critical data, the encryption algorithms and keyed message authentication codes utilizing cryptographically strong random number generation and password based key derivations;

generating, providing, and using, via an encryption module of the security application module, one or more encryption algorithms and/or encryption keys each of which is unique to each of the respective users, each encryption key generated to use an encryption/decryption algorithm to transform critical data into cipher text, and each encryption key being generated, provided and used as a one-time use only key which is destroyed after its one-time usage;

detecting, via a tamper detection module of the security application module, unauthorized attempts to access the critical data, said tamper resistance module utilizing reverse engineering evasion and resistance, and random execution, by which no one, including a user of the ICS device, can know a current execution state of the ICS device thereby to prevent tampering with, or the theft of, any critical data; and producing, via a password authentication engine of the security application module, a one-time password each time the ICS device is accessed;

wherein the instructions for each of the steps of the employing encryption algorithms and keyed message authentication codes, the generating the encryption algorithms and/or encryption keys, the detecting of unauthorized attempts to access the critical data, and the producing of one-time passwords are each performed substantially independently of the other steps, and whereing the encryption keys and passwords are not otherwise stored by the instructions eliminating a potential threat to tampering with or the theft of critical data.

12. The computer readable media of claim 11, wherein each of the users is associated with one of a plurality of unique access levels, and wherein the generating of the one or more encryption keys is respectively associated with a unique access level.

13. The computer readable media of claim 11, wherein the generating of the encryption key is responsive to receiving a user entered password comprising a phrase including two or more words.

14. The computer readable media of claim 11, wherein the utilizing of reverse engineering evasion and resistance, and the random execution in protecting against unauthorized attempts to access critical data includes instructions using the methods of entropy and anti-debugging.

15. The computer readable media of claim 11, wherein producing one-time password includes producing the password based upon at least one of (i) a random number generator, and (ii) a value representing the current time combined together with a generated random value.

16. The apparatus of claim 1 wherein the ICS device is a smart meter used by a utility.

17. The method of claim 6 wherein the ICS device is a smart meter used by a utility.

18. The computer readable media of claim 11 wherein the ICS device is a smart meter used by a utility.

* * * * *

UNITED STATES PATENT AND TRADEMARK OFFICE
CERTIFICATE OF CORRECTION

PATENT NO.        : 9,647,834 B2
APPLICATION NO.   : 15/076818
DATED             : May 9, 2017
INVENTOR(S)       : Daniel Thanos and Satish Sharad Khanke It is certified that error appears in the above-identified patent and that said Letters Patent is hereby corrected as shown below:

In the Claims

In Column 11, Line 43, after the word encryption change "Keys" to --keys--.

In Column 11, Line 51, after the word module change "Utilizing" to --utilizing--.

In Column 11, Line 66, after the word claim 2, delete the first word "wherein".

In Column 12, Line 40, after the word thereby, add the word --preventing--.

In Column 14, Line 8, after the first word and, change "whereing" to --wherein--.

Signed and Sealed this
Eighteenth Day of July, 2017

Joseph Matal
*Performing the Functions and Duties of the*
*Under Secretary of Commerce for Intellectual Property and*
*Director of the United States Patent and Trademark Office*